US012673508B2

(12) United States Patent
Cong et al.

(10) Patent No.: US 12,673,508 B2
(45) Date of Patent: *Jul. 7, 2026

(54) SPOT GLOSS AND GLOSS CONTROL IN AN INKJET PRINTING SYSTEM

(71) Applicant: Electronics for Imaging, Inc., Fremont, CA (US)

(72) Inventors: Lianhui Cong, Concord, NH (US); Terrill Clayton, Colorado Springs, CO (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/175,140

(22) Filed: Feb. 27, 2023

(65) Prior Publication Data

US 2023/0286294 A1 Sep. 14, 2023

Related U.S. Application Data

(60) Continuation of application No. 16/904,420, filed on Jun. 17, 2020, now Pat. No. 11,590,771, which is a (Continued)

(51) Int. Cl.

| | |
|---|---|
| ***B41J 11/00*** | (2006.01) |
| ***B41J 2/01*** | (2006.01) |
| ***B41J 2/21*** | (2006.01) |
| ***B41J 3/54*** | (2006.01) |
| ***B41M 3/00*** | (2006.01) |
| ***B41M 7/00*** | (2006.01) |

(52) U.S. Cl.

CPC ........... *B41J 11/00212* (2021.01); *B41J 2/01* (2013.01); *B41J 2/21* (2013.01); *B41J 3/543* (2013.01); *B41J 11/002* (2013.01); *B41J 11/00214* (2021.01); *B41M 3/008* (2013.01); *B41M 7/0081* (2013.01)

(58) Field of Classification Search

CPC .............. B41J 11/0021; B41J 11/00212; B41J 11/00214; B41J 2/01; B41J 2/21; B41M 7/0081

See application file for complete search history.

(56) References Cited

U.S. PATENT DOCUMENTS

| | | | |
|---|---|---|---|
| 6,092,890 | A | 7/2000 | Wen et al. |
| 7,562,957 | B2 | 7/2009 | Mills et al. |

(Continued)

FOREIGN PATENT DOCUMENTS

| | | | |
|---|---|---|---|
| CN | 102333653 | A | 1/2012 |
| WO | 2015084373 | A1 | 6/2015 |

*Primary Examiner* — Douglas X Rodriguez
*Assistant Examiner* — Kendrick X Liu
(74) *Attorney, Agent, or Firm* — PERKINS COIE LLLP; Colin Fowler

(57) ABSTRACT

Embodiments of the invention provide a technique that effects spot gloss or gloss control and/or variations on one image without requiring clear inks. This is preferably accomplished by use of a multilayer printing process in which an image is first printed using a first set of color print heads and then cured, and in which the image is again printed using a second set of color print head, but where the image remains uncured for a predetermined interval to allow the ink drops applied to the media to spread and thus introduce a gloss effect.

17 Claims, 4 Drawing Sheets

Related U.S. Application Data division of application No. 14/821,043, filed on Aug. 7, 2015, now Pat. No. 10,730,318.

(56) References Cited

U.S. PATENT DOCUMENTS

| | | | |
|---|---|---|---|
| 8,684,511 | B2 | 4/2014 | Lahut et al. |
| 8,833,922 | B2 | 9/2014 | Edwards |
| 11,590,771 | B2 * | 2/2023 | Cong .................. B41M 7/0081 |
| 2002/0175984 | A1 | 11/2002 | Ylitalo et al. |
| 2006/0082813 | A1 | 4/2006 | Martin et al. |
| 2006/0158481 | A1 | 7/2006 | Spevak et al. |
| 2006/0243924 | A1 | 11/2006 | Sampson |
| 2007/0097197 | A1 | 5/2007 | Kremers et al. |
| 2008/0198189 | A1 | 8/2008 | Vanhooydonck et al. |
| 2009/0085256 | A1 * | 4/2009 | Mataki .................... B41M 5/00 264/401 |
| 2009/0225143 | A1 | 9/2009 | Fukui |
| 2010/0154244 | A1 | 6/2010 | Kuta et al. |
| 2010/0194838 | A1 | 8/2010 | Mitsuzawa |
| 2010/0201771 | A1 | 8/2010 | Mitsuzawa |
| 2010/0289852 | A1 | 11/2010 | Woolfe et al. |
| 2011/0242243 | A1 * | 10/2011 | Miyabayashi ............ B41J 2/01 347/102 |
| 2011/0310204 | A1 | 12/2011 | Ohnishi |
| 2013/0065027 | A1 * | 3/2013 | Mochizuki ............ C09D 11/40 347/100 |
| 2013/0286060 | A1 * | 10/2013 | Duffield .................. B41J 29/38 347/102 |
| 2015/0138268 | A1 | 5/2015 | Chen et al. |
| 2015/0321488 | A1 | 11/2015 | Ohnishi |

* cited by examiner

SPOT GLOSS AND GLOSS CONTROL IN AN INKJET PRINTING SYSTEM

CROSS-REFERENCE TO RELATED APPLICATION

This application is continuation of U.S. patent application Ser. No. 16/904,420, filed on Jun. 17, 2020, which is a division of U.S. patent application Ser. No. 14/821,043, filed on Aug. 7, 2015, now U.S. Pat. No. 10,730,318, which are incorporated by reference herein in their entirety.

FIELD

The invention relates to inkjet printing. More particularly, the invention relates to spot gloss and gloss control in an inkjet printing system.

BACKGROUND

Inkjet printing involves depositing droplets of liquid ink onto a printing medium from one or more printer heads. The printer heads are coupled with a container containing ink. Ink is ejected from one or more nozzles of the print heads when a piezoelectric crystal in the print head is actuated. The piezoelectric crystal generates a pulse in the ink so that the ink expels through the nozzle as a droplet. To create the image, a carriage which holds one or more print heads scans or traverses across the printing medium, while the print heads deposit ink as the printing medium moves.

Large format printing is performed to create signs, banners, museum displays, sails, bus boards, POP applications, and the like. Oftentimes consumers of large format prints prefer to choose a full or partial gloss finish to create striking displays. Gloss finishes come in various reflective intensities measured in Gloss Number. Gloss Number measures how much light is reflected at a given position. In today's art, gloss finishes are commonplace with solvent based SWF printers, but a high gloss finish is not available on today's UV printers due to the fact that the curing of the droplets of UV ink leaves a matte surface structure, rather than a very smooth finish.

Spot gloss allows one to put gloss coating on some parts of a printed image while leaving other parts uncoated. For instance, one may want to apply gloss coating to a company logo, and leave the rest of the image in a matte finish. If spot gloss is needed in inkjet printing, the background image normally is printed first, and then the printing media is reversed back through the printer carriage for a second run, or the media is removed and reloaded. This approach requires additional handling of the media, which decreases throughput and which can also result in registration errors. Alternatively, a multilayer technique can be used to print a layer of clear inks on a target area to create a spot gloss or a gloss overcoat. In this approach, a clear ink channel is required to achieve the spot gloss and/or a gloss overcoat.

SUMMARY

Embodiments of the invention provide a technique that effects spot gloss or gloss control and/or variations on one image without requiring clear inks. This is preferably accomplished by use of a multilayer printing process in which an image is first printed, from pixel image data and using a first set of color print heads and then cured, and in which the image is again printed from the same pixel image data and using a second set of color print head, but where the image remains uncured for a predetermined interval to allow the ink drops applied to the media to spread and thus introduce a gloss effect.

DRAWINGS

DESCRIPTION

Embodiments of the invention provide a technique that effects spot gloss or gloss control and/or variations on one image without requiring clear inks. Spot gloss concerns the selective application of gloss effects to portions of an image, i.e. spots such as an item or portion of the text, while gloss effects can also be applied to the entire image, i.e. the entire printed image is glossy. This is preferably accomplished by use of a multilayer printing process in which an image is first printed using a first set of color print heads and then cured, and in which the image is again printed using a second set of color print heads, but where the image remains uncured for a predetermined interval to allow the ink drops applied to the media to spread and thus introduce a gloss effect. Such multiple layers are readily generated using image editing software, such as Adobe Photoshop®.

Figure 1A:
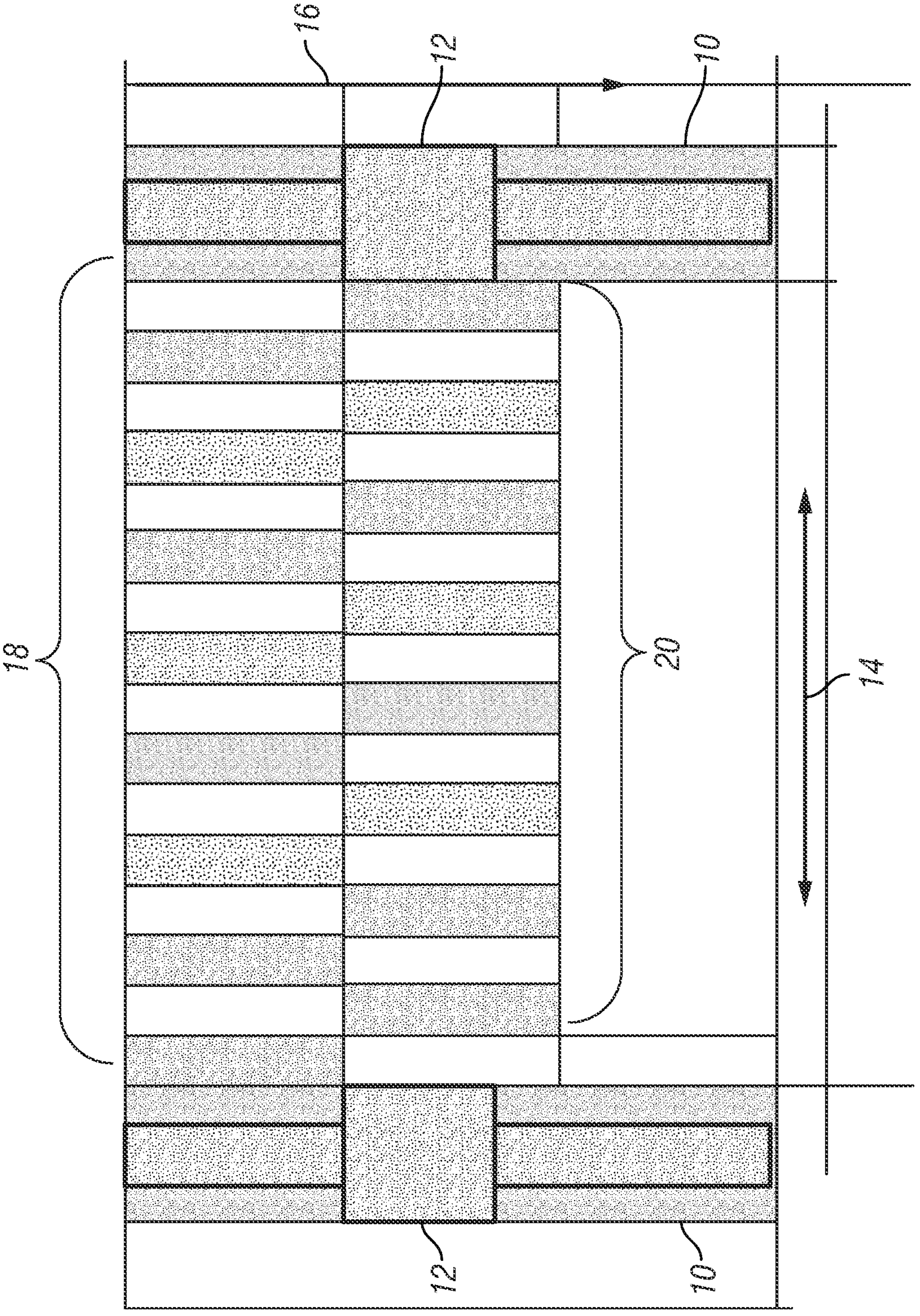
FIGS. 1A and 1B are plan views showing a carriage for an inkjet printing system that provides spot gloss and gloss control according to the invention.
Figure 1B:
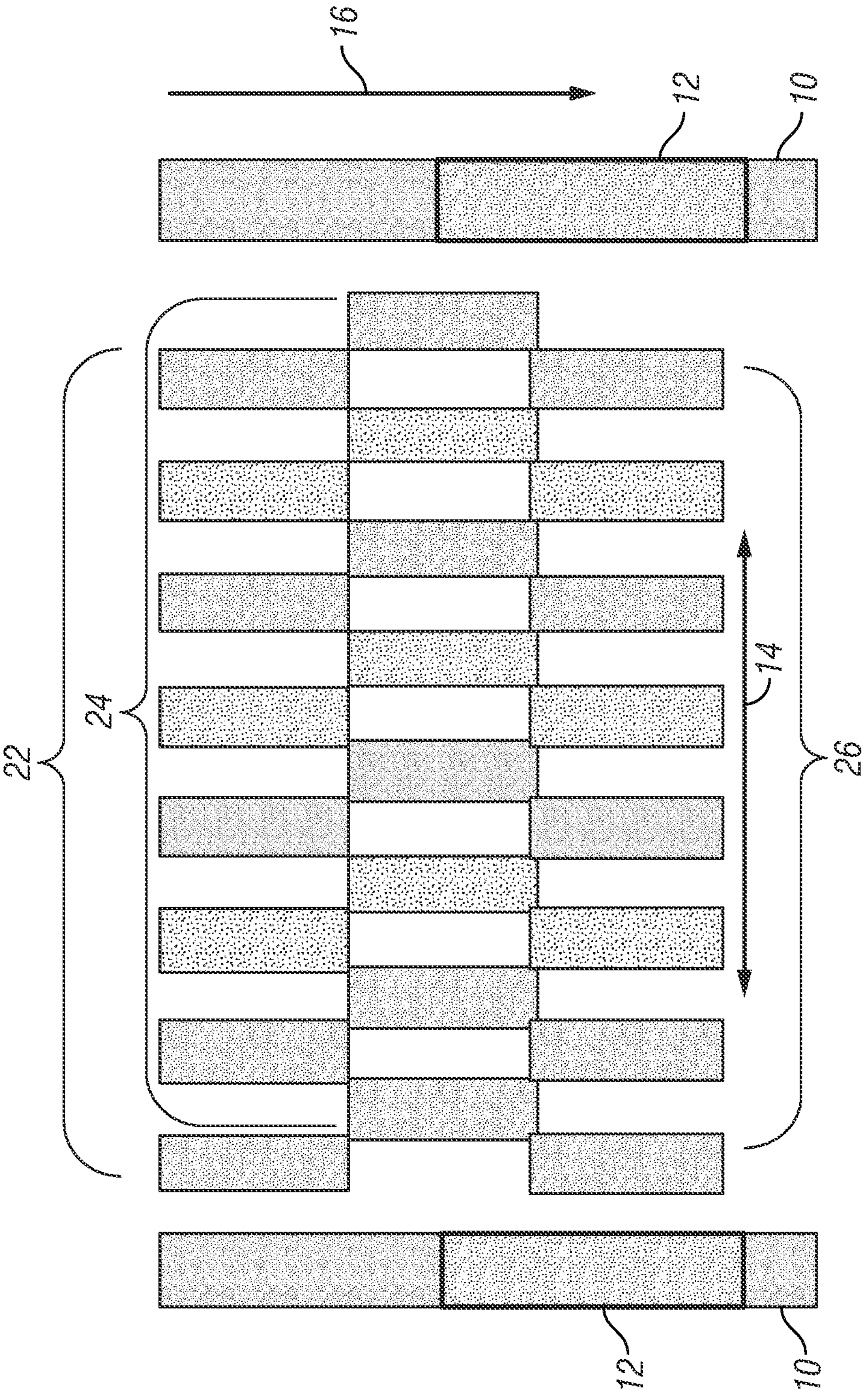

FIGS. 1A and 1B are plan views showing a carriage for an inkjet printing system that provides spot gloss and gloss control according to the invention. In the example of FIGS. 1A and 1B, there are eight colors, every color has two or three printing heads, although there can be one or more than three printing heads for every color.

To print a two layer image, the shroud 12 covering the emitting window of the UV lamp 10 can start with the second row of printing heads (FIG. 1A) or start with the middle of the second row (FIG. 1B). The length of the shroud can be adjusted to control the time allowed for the ink spreading to control the gloss level. In embodiments of the invention, the minimum length of the shroud could cover, for example, the second row of the printing heads.

In embodiments of the invention, the spreading of the ink drops can be controlled in any of two ways, e.g. the shroud blocks the UV light to allow the liquid ink to spread without intervention of UV light, or the shroud is a screened to allow a controllable amount UV light to pass through to partially pin the ink drops to control the spread of spreading.

As shown in FIGS. 1A and 1B, an ink jet printer for use in connection with embodiments of the herein disclosed invention includes a moving carriage (13, see FIG. 3) that is operable to move back and forth (14) over a moving belt (15, see FIG. 3) or table to deposit the inks on the media which, in turn, is moved by a belt, table, or roller (15). In embodiments of the invention, the belt, table, or roller (15) moves the media in a direction (16) that is perpendicular to that of the carriage (13). Such printers are considered to be continuous printers because the carriage (13) and media continue to move relative to each other as described above until printing of the desired image on the media is completed.

Figure 2:
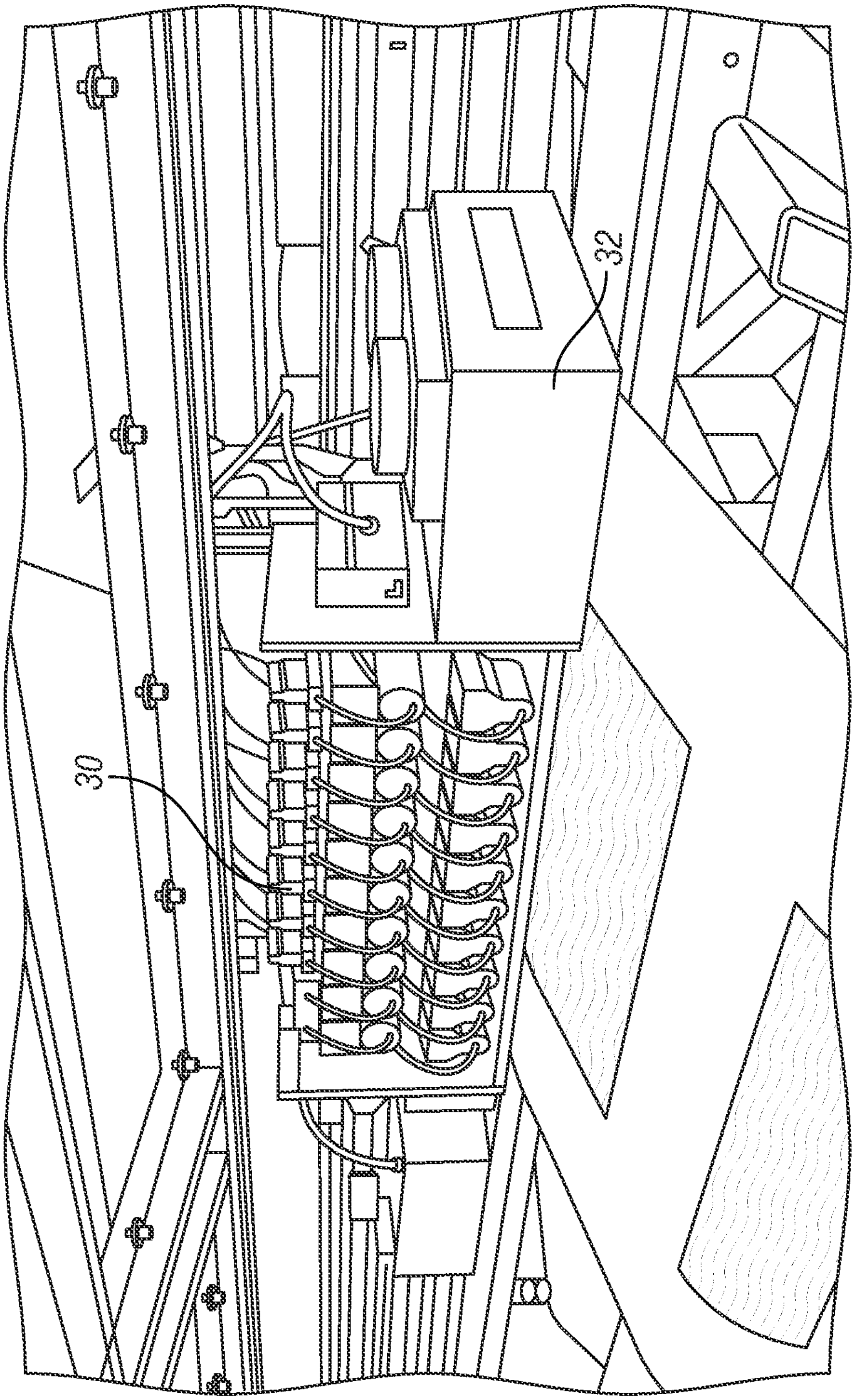
FIG. 2 is a perspective view of an exemplary inkjet printer for use in connection with the invention.

FIG. 2 is a perspective view of an exemplary inkjet printer for use in connection with the invention. In FIG. 2, the printing heads 30 and mercury arc UV lamp 32 are shown mounted on a carriage. The inkjet printer carriage contains multiple print heads 18/20 (FIG. 1A) or 22, 24, 26 (FIG. 1B) which are used to deposit, for example, radiation-curable inks on the media. The print heads in the inkjet printer can be arranged in any of single row or, as shown in FIGS. 1A and 1B, multiple rows for each color.

Figure 3:
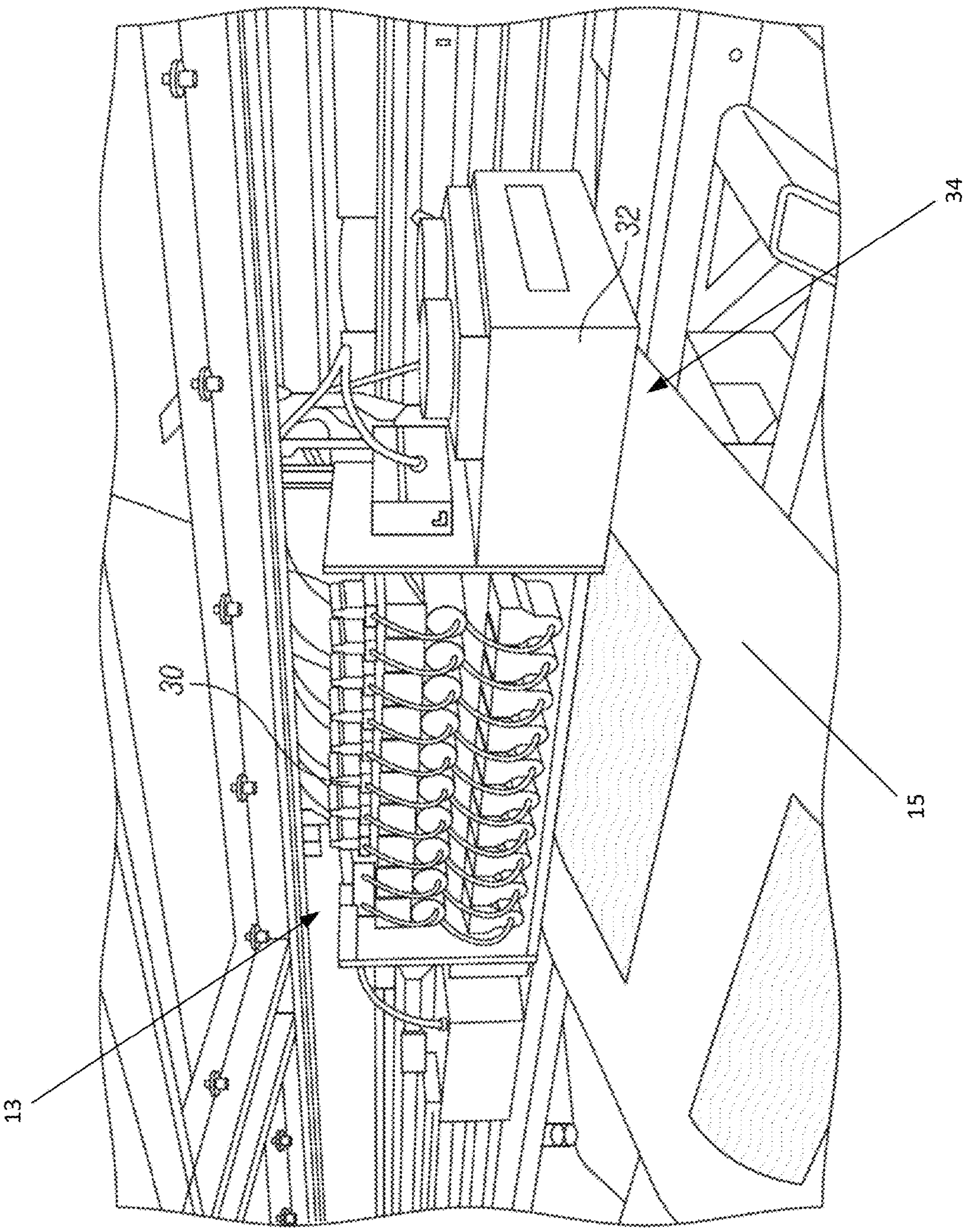
FIG. 3 is a flow diagram showing a technique for spot gloss and gloss control in an inkjet printing system.

FIG. 3 is a flow diagram showing a technique for spot gloss and gloss control in an inkjet printing system. The image to be printed on the media is processed as a two-layer or multilayer image from pixel image data corresponding to the image. As mentioned above, this can be accomplished using known techniques, such as by use of such software as Adobe Photoshop®. The first layer is the normal image portion, i.e. the first layer is not given a gloss treatment. This layer is printed using the pixel image data and by a first set of print heads (100) and cured (110). The second layer contains the portion of the image that expresses the desired level of gloss, as well as those spots to which gloss is to be applied if the image has selectively predetermined areas that have more gloss relative to other areas of the image. This layer is printed using the same pixel image data but by a second set of print heads (120). This ink is not immediately cured and is therefore allowed to spread to create a gloss effect (130). Once the desired gloss effect is achieved, the second ink layer is cured (140).

The time allowed for ink drop spreading is critical for the gloss. More time allowed for ink spreading results in more gloss achieved. The time, for example, can be less than a second to several minutes; the gloss level can be 10-100 gloss units. The curing of UV inks can be instantaneous or up to many seconds dependent on the UV energy available for curing.

In another embodiment of the invention, a screen shroud is used to pin the ink drops to convert them to a partial liquid or gel state to control the speed of ink drop spreading further and thereby vary the gloss.

Examples of UV inks can be found in U.S. Pat. No. 8,889,232B2 (Cong). A radiation curable ink composition (see Table 1 below) may comprise one or more of:

an oligomer component;
a monomer component;
a photo-initiator component;
a colorant component; and
an additive component.

TABLE 1

Ink Composition

| RAW MATERIALS | | INK COMPOSITION | | | |
|---|---|---|---|---|---|
| | | Cyan | Magenta | Yellow | Black |
| Component | Chemical Name | 2A | 2B | 2C | 2D |
| Pigment | Pigment | 2.00 | 2.90 | 2.00 | 3.00 |
| SR-9003 | Propoxylated (2) Neopentyl glycol Diacrylate | 3.60 | 10.10 | 6.00 | 8.77 |
| CN 2303 | Hyperbranched PEA | 11.50 | 10.00 | 10.50 | 11.50 |
| CN820 | Acrylic Oligomer | 8.00 | 5.30 | 6.30 | 6.00 |
| SR285 | Tetrahydrofurfuryl Acrylate | 35.24 | 36.00 | 35.70 | 35.00 |
| SR506 | Isobornyl Acrylate | 11.58 | 9.67 | 12.02 | 10.15 |
| V-CAP | Vinyl-Caprolactam | 13.90 | 12.35 | 13.30 | 9.90 |
| ST-1 | Stabilizer | 0.10 | 0.10 | 0.10 | 0.10 |
| BYK-361N | Polyacrylate | 0.50 | 0.50 | 0.50 | 0.50 |
| BYK-377 | Polyether Modified Polydimethyl Siloxane | 0.075 | 0.075 | 0.075 | 0.075 |
| Genocure TPO | Photoinitiator | 8.00 | 8.00 | 8.00 | 9.50 |

TABLE 1-continued

Ink Composition

| RAW MATERIALS | | INK COMPOSITION | | | |
|---|---|---|---|---|---|
| | | Cyan | Magenta | Yellow | Black |
| Component | Chemical Name | 2A | 2B | 2C | 2D |
| Irgacure 379 | Photoinitiator | 0.50 | 0.50 | 0.50 | 0.50 |
| Darocur 1173 | Photoinitiator | 3.00 | 2.50 | 3.00 | 3.00 |
| Esacure One | Photoinitiator | 2.00 | 2.00 | 2.00 | 2.00 |

Referring again to FIGS. 1A and 1B, in an embodiment of the invention, the first half of the printing heads for each color 18 is used to print the first layer. Once the inks are deposited on the media, the inks are immediately exposed to UV lamps 10 that, in an embodiment of the invention, are attached on the both ends of the carriage. The inks are then cured.

The second half of the printing heads of each color 20 are used to print the second layer. In embodiments of the invention, a part of the UV lamps is covered or screened 12, as shown in FIGS. 1A and 1B. As such, there is no UV radiation or limited UV radiation output available to cure the second layer inks. As a result, the inks are given more time to spread on the media and thus give a varied gloss appearance to the first layer, dependent on the UV energy available through the covered or screened portion of the lamp.

In embodiments of the invention, the length of the screening or blocking effect determines the amount of gloss achieved, where a longer time before the cure is completed produces a greater gloss effect because the ink droplets have greater time to spread before being completely cured.

In embodiments of the invention, screening can be applied by a shutter mechanism (12) that is variably adjustable to produce selected gloss effects. Such shutter mechanism (12) can be any of a mechanical shutter, for example that is operated by a user or an actuator; or an electronic shutter, such as an electronic panel (34, See FIG. 3) having a selectable degree of opacity. In the case of a mechanical shutter, the amount of light allowed to pass there through to effect ink curing can be a function of the density of the shutter, e.g. by varying the density of a screen mesh, or a function of the length of the shutter, e.g. by selectably changing the length of the shutter to affect the length of time that the ink is allowed to spread before being cured.

In other embodiments of the invention, a variable gap between the curing lamps may be introduced into the carriage such that the gloss layer of ink initially passes through the gap and is thus not cured during the time it takes to clear the gap. In embodiments of the invention, the gap can be selectively variable, for example by operation of a drive mechanism that moves the curing lamps relative to each other to establish the gap. The size of the gap then determines the time required for curing the gloss layer and, hence, the amount of ink drop spread and resulting gloss effect. Some such embodiments move the UV lamps on both sides of carriage away each other on the carriage moving direction. In other embodiments, every UV lamp is sectioned, where the section used to cure the second layer can be moved away from the section used to cure the first layer image in the media moving direction to create gaps that achieve a similar effect of the shroud.

In embodiments of the invention, a printer dialog may be provided to the user that allows the user to select a degree of gloss applied. For example, a slider control (34, See FIG.

3) may be provided that adjusts the opacity, density, or length of the shutter or screen mechanism. Embodiments of the invention control gloss through mechanical, electronic, or software mechanisms installed on the printer. In practice, the gloss level setting is optimized to the type of UV inks used in the printer. Every UV ink formulation is different in terms of curing speed and properties, thereby different gloss settings are needed to be adjusted to fit the different UV inks.

Eventually, as the media advances through the printer, the second layer ink moves past the covered or screened part of the curing lamp and reaches a region where it is exposed to sufficient radiation to be cured.

The covered or screened portion can be applied on either lamps or to single lamp to achieve different gloss effects. Further, as discussed above, the length of the covered or screened portion of the UV lamps can be adjusted based on the printing speed and desired gloss variation effects. A longer covered or screened lamp portion allows more time for the inks to flow before being cured. In this way, a higher level of gloss is achieved.

Embodiments of the invention can be used to control the gloss of an entire image in a printer that is setup for single layer printing. In such embodiments, the image is processed as one layer and the beginning portion of the lamp is covered or screened to control the rate at which ink drops spread and, thus vary the gloss of the image without printing the image via a multilayer process. In another embodiment, the first layer is blank and the second layer is the whole image. Because the gloss of the second layer can be controlled the gloss of the whole image can be controlled.

As discussed above, a portion of the UV lamp, such as a mercury arc lamp, that is used to cure ink after the ink is applied to the media by the second half of the printing heads is covered or screened such that no UV or a reduced amount of UV energy reaches the inks deposited on the media.

For UV LED lamps, in embodiments of the invention a portion of the LED lamp can be controlled to vary the energy output, such that similar effects to those achieved with mercury arc lamps can be obtained without requiring mechanical blocking or screening. As discussed above, a user printer dialog may be provided that allows the user to select the level of gloss provided.

In embodiments of the invention, the printing heads for each color can be arranged in multiple rows. Two rows are shown in FIG. 1 for purposes of description only. For example, if there are three heads per color, the second half of printing heads, i.e. the part that is used for gloss effect, starts from the middle of the second head.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for selectively applying gloss effects to any and/or all portions of an image, comprising:

with an inkjet printing system, printing a two-layer image from pixel image data corresponding to said image on a medium using a set of color print heads;

curing said printed two-layer image with a curing operation;

introducing a variable gap between two or more UV curing lamps;

performing said curing operation with one or more UV curing lamps;

covering or screening a portion of said one or more UV curing lamps via setting of a shutter mechanism that includes an electronic panel, the electronic panel having a selectable degree of opacity, wherein a slider control enables a granular selection of the opacity of the electronic panel, and wherein the opacity of the electronic panel sets an amount of covering or screening of the portion of said one or more UV curing lamps; and selecting the amount of covering or screening of the portion of said one or more UV curing lamps, via the slider control, wherein selecting the amount of covering or screening varies a gloss effect in a second layer of the two-layer image by controlling a rate at which ink drops applied by said set of color print heads spread; and initially passing said second layer through said variable gap, wherein said second layer remains uncured while said second layer clears said variable gap.

2. The method of claim 1, further comprising:

generating at least two layers of said image using image editing software wherein at least one of said at least two layers comprises a first layer, and wherein at least one of said at least two layers comprises said second layer.

3. The method of claim 2, further comprising:

continuously moving a carriage in said inkjet printing system back and forth over a moving belt or table to deposit ink on said medium; and in turn, continuously moving said medium by the moving belt, the table, or a roller, wherein said belt, table, or roller moves said medium in a direction that is perpendicular to that of said carriage.

4. The method of claim 3, further comprising:

providing multiple print heads on said carriage, wherein said multiple print heads are arranged in any of single row or multiple rows for each color.

5. The method of claim 1, further comprising:

processing said image to be printed on said medium as the two-layer image or a multilayer image.

6. The method of claim 1, wherein ink of said ink drops comprises a UV curable ink.

7. The method of claim 1, wherein said covering or screening is fully opaque to UV radiation.

8. The method of claim 1, being further configured for:

selectably varying a size of the variable gap by moving said one or more UV curing lamps relative to each other to establish said variable gap; and setting said size of the variable gap to determine time required to cure said second layer.

9. An apparatus for selectively applying gloss effects to any and/or all portions of an image, comprising:

an inkjet printing system including a set of color print heads configured for printing said image as a first layer from pixel image data on a medium configured to be printed with a two-layer image;

one or more UV curing lamps configured to cure said printed two-layer image with a curing operation, wherein the UV curing lamps are further configured to introduce a variable gap between two or more UV curing lamps; and a shutter mechanism that includes an electronic panel having a selectable degree of opacity covering or screening a portion of said one or more UV curing lamps, wherein a slider control enables a granular selection of the opacity of the electronic panel, and wherein selecting the opacity of the electronic panel varies a gloss effect in a second layer of the two-layer image by controlling a rate at which ink drops applied by said set of color print heads spread and initially passing said second layer through said variable gap, wherein said second layer remains uncured while said second layer clears said variable gap.

10. The apparatus of claim 9, being further configured for generating at least two layers of said image using image editing software, wherein at least one of said at least two layers comprises said first layer, and wherein at least one of said at least two layers comprises said second layer.

11. The apparatus of claim 9, being further configured for:

continuously moving a carriage in said inkjet printing system back and forth over a moving belt or table to deposit ink on said medium; and in turn, continuously moving said medium by a belt, the table, or a roller;

wherein said belt, table, or roller moves said medium in a direction that is perpendicular to that of said carriage.

12. The apparatus of claim 11, wherein the set of color print heads include multiple print heads on said carriage, wherein said multiple print heads are arranged in any of single row or multiple rows for each color.

13. The apparatus of claim 9, being further configured for: processing said image to be printed on said medium as the two-layer image or a multilayer image.

14. The apparatus of claim 9, wherein ink used by the set of color print heads comprises a UV curable ink.

15. The apparatus of claim 9, wherein said covering or screening is fully opaque to UV radiation.

16. The apparatus of claim 9, wherein said covering or screening further comprises:

adjusting an amount of light allowed to pass through said shutter mechanism to effect ink curing as a function of any of density of said shutter or length of said shutter.

17. The apparatus of claim 9, being further configured for:

selectably varying a size of the variable gap by moving said one or more UV curing lamps relative to each other to establish said variable gap; and setting said size of the variable gap to determine time required to cure said second layer.

* * * * *